United States Patent
Lakshminarasimhan et al.

(10) Patent No.: US 11,341,113 B1
(45) Date of Patent: May 24, 2022

(54) HYBRID LOCKING MECHANISM IN RELATIONAL DATABASE MANAGEMENT SYSTEMS

(71) Applicant: Kyndryl, Inc., New York, NY (US)

(72) Inventors: Sriram Lakshminarasimhan, Chennai (IN); Prasanna Veeraraghavan, Chennai (IN); Saravanan Dakshnamoorthy, Chennai (IN); Suryanarayana Rao, Bangalore (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/200,969

(22) Filed: Mar. 15, 2021

(51) Int. Cl.
*G06F 17/30* (2006.01)
*G06F 16/23* (2019.01)
*G06F 16/22* (2019.01)
*G06F 16/28* (2019.01)

(52) U.S. Cl.
CPC ...... *G06F 16/2343* (2019.01); *G06F 16/2255* (2019.01); *G06F 16/284* (2019.01)

(58) Field of Classification Search
CPC .......... G06F 16/13; G06F 16/22; G06F 16/24; G06F 16/156; G06F 16/1774; G06F 16/2336; G06F 16/2343; G06F 9/52; G06N 3/00; G06N 5/00; G05B 13/00
See application file for complete search history.

(56) References Cited

U.S. PATENT DOCUMENTS

| | | | |
|---|---|---|---|
| 6,144,983 A | 11/2000 | Klots | |
| 6,418,438 B1 * | 7/2002 | Campbell | G06F 16/2343 |
| | | | 707/999.008 |
| 6,754,656 B1 * | 6/2004 | Cornwell | G06F 16/2343 |
| | | | 707/999.009 |
| 6,904,431 B2 | 6/2005 | Holmgren | |
| 7,236,974 B2 | 6/2007 | Bhattacharjee | |
| 7,552,121 B2 | 6/2009 | Barsness | |
| 7,617,180 B1 | 11/2009 | Sehgal | |
| 7,890,482 B2 | 2/2011 | Cornwell | |
| 8,086,579 B1 | 12/2011 | Chandrasekaran | |
| 9,690,818 B2 | 6/2017 | Pasupuleti | |
| 2004/0199512 A1 * | 10/2004 | Cornwell | G06F 16/2343 |
| | | | 707/999.009 |
| 2004/0205066 A1 * | 10/2004 | Bhattacharjee | G06F 16/2343 |
| 2005/0289188 A1 * | 12/2005 | Nettleton | G06F 16/2343 |
| 2011/0131193 A1 * | 6/2011 | Pasupuleti | G06F 16/2336 |
| | | | 711/E12.001 |

(Continued)

FOREIGN PATENT DOCUMENTS

EP 2113852 A2 4/2009

OTHER PUBLICATIONS

Fard, H. J., "SQL Server Lock Internals", Fard Solutions, Mar. 26, 2016, pp. 1-4, <https://fard-solutions.com/2016/03/26/sql-server-lock-internals/>.

*Primary Examiner* — Hung D Le
(74) *Attorney, Agent, or Firm* — Ken Han, Esq.; Kevin P. Radigan, Esq.; Heslin Rothenberg Farley & Mesiti P.C.

(57) ABSTRACT

A transaction is received. The transaction involves a data in a relational database management system. A page in the relational database management system is determined with the data. Whether the page has a hybrid lock enabled is determined using a hybrid lock hash table. Responsive to determining the page has the hybrid lock enabled, whether the page is above the hot page threshold is determined.

20 Claims, 15 Drawing Sheets

(56) References Cited

U.S. PATENT DOCUMENTS

| | | | |
|---|---|---|---|
| 2012/0059963 A1* | 3/2012 | Pasupuleti | G06F 16/2343 710/200 |
| 2017/0118286 A1 | 4/2017 | Matsuda | |
| 2019/0042615 A1 | 2/2019 | Wang | |
| 2020/0226109 A1 | 7/2020 | Das | |

* cited by examiner

HYBRID LOCKING MECHANISM IN RELATIONAL DATABASE MANAGEMENT SYSTEMS

BACKGROUND

The present invention relates generally to the field of relational database management systems (RDBMS), and more particularly to using a hybrid locking mechanism for tables/pages/rows in a RDBMS.

A RDBMS is a subset of Database Management Systems that stores data in a structure format using rows and columns. This allows a user to define, create, maintain and control access to the database. The use of rows and columns makes the RDBMS easier to locate and access specific values within the database. The RDBMS is relational because values within each table of the database may be related to other tables within the database.

SUMMARY

Embodiments of the present invention provide a computer-implemented method, a computer program product, and a system for database management. In one embodiment, a transaction is received. The transaction involves a data in a relational database management system. A page in the relational database management system is determined with the data. Whether the page has a hybrid lock enabled is determined using a hybrid lock hash table. Responsive to determining the page has the hybrid lock enabled, whether the page is above the hot page threshold is determined.

DETAILED DESCRIPTION

The present invention provides a method, computer program product, and computer system for hybrid locking of pages, and/or rows in a relational database management system. Embodiments of the present invention recognize that locking of tables, pages, and or rows in a relational database management system ensure data integrity. Embodiments of the present invention recognize that harmonizing data concurrency and optimal lock resource consumption can be done by the use of the hybrid locking system described below.

Embodiments of the present invention recognize that page level locking is preferred in a relational database management system as a tradeoff between concurrency and optimal lock resource consumption which are served better by row level locking and table level locking, respectively. Embodiments of the present invention recognize that a hybrid lock system that uses both page level and row level locking can create a balance between concurrency and lock resource consumption which lead to a higher degree of concurrency whilst utilizing locking resources more optimally than currently. Embodiments of the present invention recognize that by employing a hybrid locking strategy that employs page and/or row locking in different sections of a relational database management system based on demand can provide the above advantages.

Embodiments of the present invention recognize that improvements can be made to the duration for which portions of data are inaccessible to requesting sessions in relational database management system. Embodiments of the present invention recognize that improvements can be made to the increased resource consumption due to excessive lock acquisition and for lower levels of granularity.

Embodiments of the present invention provide for optimize lock resource utilization. Embodiments of the present invention provide for greater concurrency. Embodiments of the present invention provide for improved transaction throughput even during peak utilization periods. Embodiments of the present invention provide for less locking overhead.

Embodiments of the present invention provide for a program that determines "hot" pages and tracks them for a relational database management system. Embodiments of the present invention provide for identifying pages that have fallen off of the "hot" list. Embodiments of the present invention provide a simultaneous approach that promotes data concurrency whilst optimizing lock resource consumption by using a hybrid locking strategy. Embodiments of the present invention provide for a program that locks "hot" pages at the lowest possible granularity (i.e., row level locks) and non-hot pages at an intermediate level of granularity (i.e. page level locks).

Figure 1:
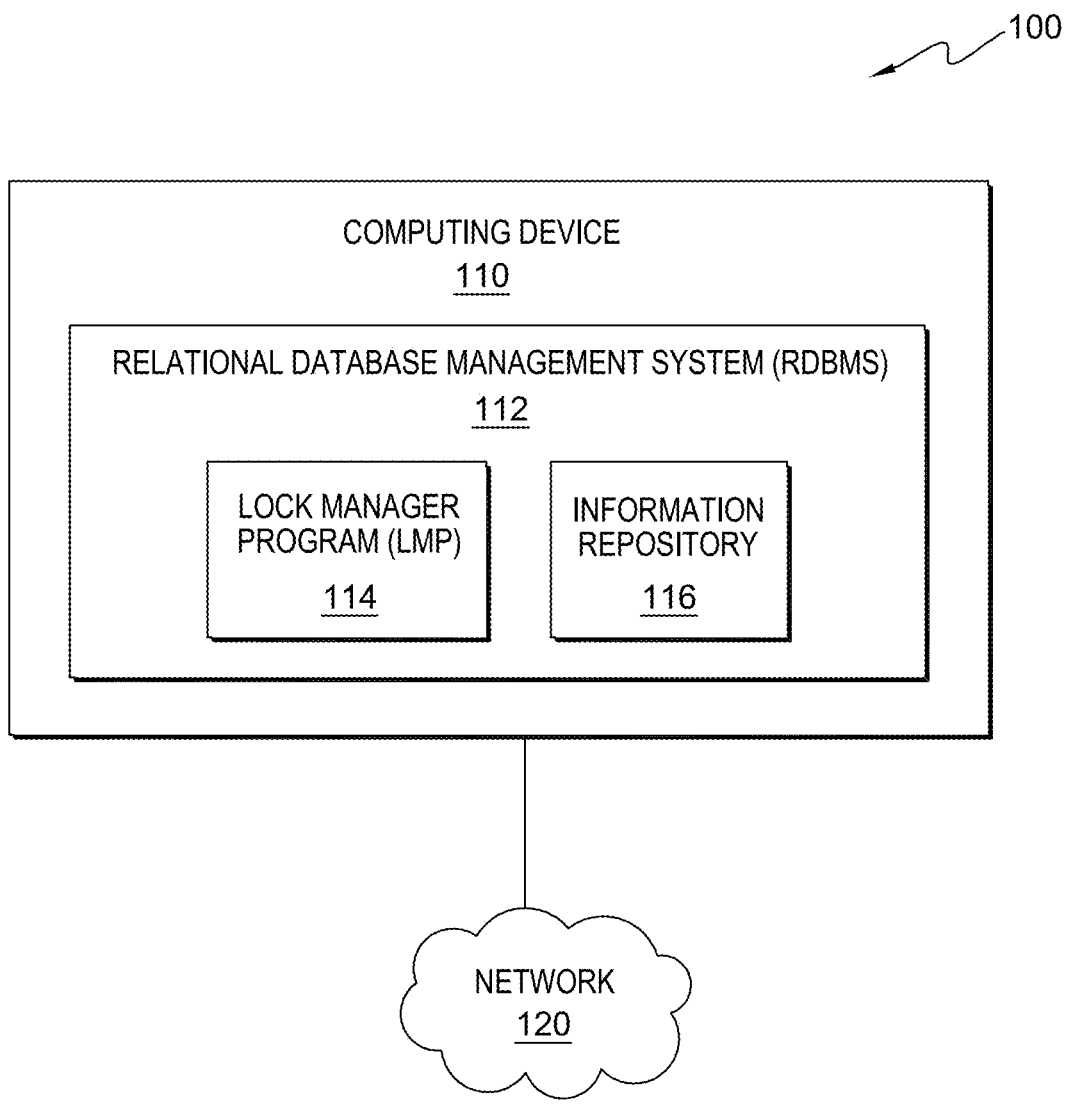
FIG. 1 is a functional block diagram of a network computing environment, generally designated 100, suitable for operation of relational database management system 112 and lock manager program 114, in accordance with at least one embodiment of the invention.

Referring now to various embodiments of the invention in more detail, FIG. 1 is a functional block diagram of a network computing environment, generally designated 100, suitable for operation of relational database management system (RDBMS) 112 and lock manager program (LMP) 114, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110 interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g., database server computers, application server computers, web servers, and media servers) that act as a single pool of seamless resources when accessed within network computing environment 100.

In an embodiment, computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In various embodiments of the invention, computing device 110 includes RDBMS 112. In an embodiment, RDBMS 112 is a type of database management system that stores data in a structured format using pages, tables, rows and columns. In an embodiment, a user, via the user interface described above, may define, create, maintain and control access to the database. In an embodiment, RDBMS 112 includes, one or more tables of data, and each table of data may include one or more row of data and one or more column of data. In order to maintain concurrency in RDBMS 112, or any database management system, RDBMS 112 locks, in other words restricts access to a single user, a piece of data when the user wants to use, change, read, write, edit, modify, etc. any that piece of data. In an embodiment, during the lock period, the locked data is inaccessible to other data requesters. In an embodiment, RDBMS 112 includes lock manager program (LMP) 114 and information repository 116.

In an embodiment, RDBMS 112 includes LMP 114. Embodiments of the present invention provide for an LMP 114 that provides a hybrid locking mechanism for data being accessed in RDBMS 112. In an embodiment, LMP 114 receives one or more factors, described below, to determine the demand of a page the data is stored on. In an embodiment, LMP 114 updates a hybrid lock hash page based on the one or more factors. In an embodiment, LMP 114 determines if a threshold has been met. In an embodiment, if a threshold has been met, then LMP 114 determines the one or more factors and updates the hybrid lock hash page based on the one or more factors. In an embodiment, if a threshold has not been met, then LMP 114 waits and then determines if a threshold has been met.

In an embodiment, RDBMS 112 includes information repository 116. In an embodiment, information repository 116 may be managed by RDBMS 112 alone, or together with, LMP 114. In an alternative embodiment, information repository 116 may be managed by the operating system of computing device 110, another program (not shown), alone, or together with, RDBMS 112 and/or LMP 114. Information repository 116 is a data repository that can store, gather, and/or analyze information. In some embodiments, information repository 116 is located externally to computing device 110 and accessed through a communication network, such as network 120. In some embodiments, information repository 116 is stored on computing device 110. In some embodiments, information repository 116 may reside on another computing device (not shown), provided information repository 116 is accessible by computing device 110. In an embodiment, information repository 116 includes data in a structured format using pages, tables, rows and columns. In an embodiment, information repository 116 may include page factors which include, but is not limited to, bufferpool residency time of a page, number of transactions waiting for a given page, and amount of wait time for a given page. In an embodiment, information repository 116 may include locking hierarchies of tables/pages/rows for data found in information repository that is not controlled by the hybrid locking mechanism due to the data not being found on "hot"

pages in the hybrid lock hash page(s). In an embodiment, information repository 116 may include hybrid lock hash page(s). In an embodiment, information repository 116 may include a "hot" page threshold.

In an embodiment, the hybrid lock hash page(s) are a ranked list of pages managed by LMP 114 and/or RDBMS 112. In an embodiment, each hybrid lock hash page(s) has a "hot" page threshold number of pages, based on user input at either time of creation of the database and/or during operation of the database. In an embodiment, any page ranked higher (one being ranked higher than ten) than the "hot" page threshold will use a hybrid locking mechanism, as discussed in steps 206 and 214 of FIG. 2. In an embodiment, any page ranked lower (twenty being lower than ten) than the "hot" page threshold will use hierarchical locking strategies, as discussed in step 206 and 208 of FIG. 2.

In an embodiment, the hybrid lock hash page(s) are designed as a mapped object ID-page number pair, in other words the ID of the data is matched with the page it is located on, and each page is ranked, as discussed below, based on the page factors, noted above, to determine "hot" pages. In a first embodiment, the hybrid lock hash page(s) may include and rank all pages that are managed by LMP 114 and/or RDBMS 112 that are ranked higher than the "hot" page threshold. In a second embodiment, hybrid lock hash page(s) may include and rank all pages that are managed by LMP 114 and/or RDBMS 112 even if the pages are ranked lower than the "hot" page threshold.

In a first embodiment, hybrid lock hash page(s) may include a single ranking, based on an equal weighting of the one or more factors. In a second embodiment, hybrid lock hash page(s) may include multiple rankings, one for each of factor, and a final ranking that is an equal weighting of some and/or all of the one or more factors. In an embodiment, the final ranking may be determined based on an unequal or equal weighting of some and/or all of the one or more factors.

Information repository 116 may be implemented using any volatile or non-volatile storage media for storing information, as known in the art. For example, information repository 116 may be implemented with a tape library, optical library, one or more independent hard disk drives, multiple hard disk drives in a redundant array of independent disks (RAID), solid-state drives (SSD), or random-access memory (RAM). Similarly, information repository 116 may be implemented with any suitable storage architecture known in the art, such as a relational database, an object-oriented database, or one or more tables.

Figure 2:
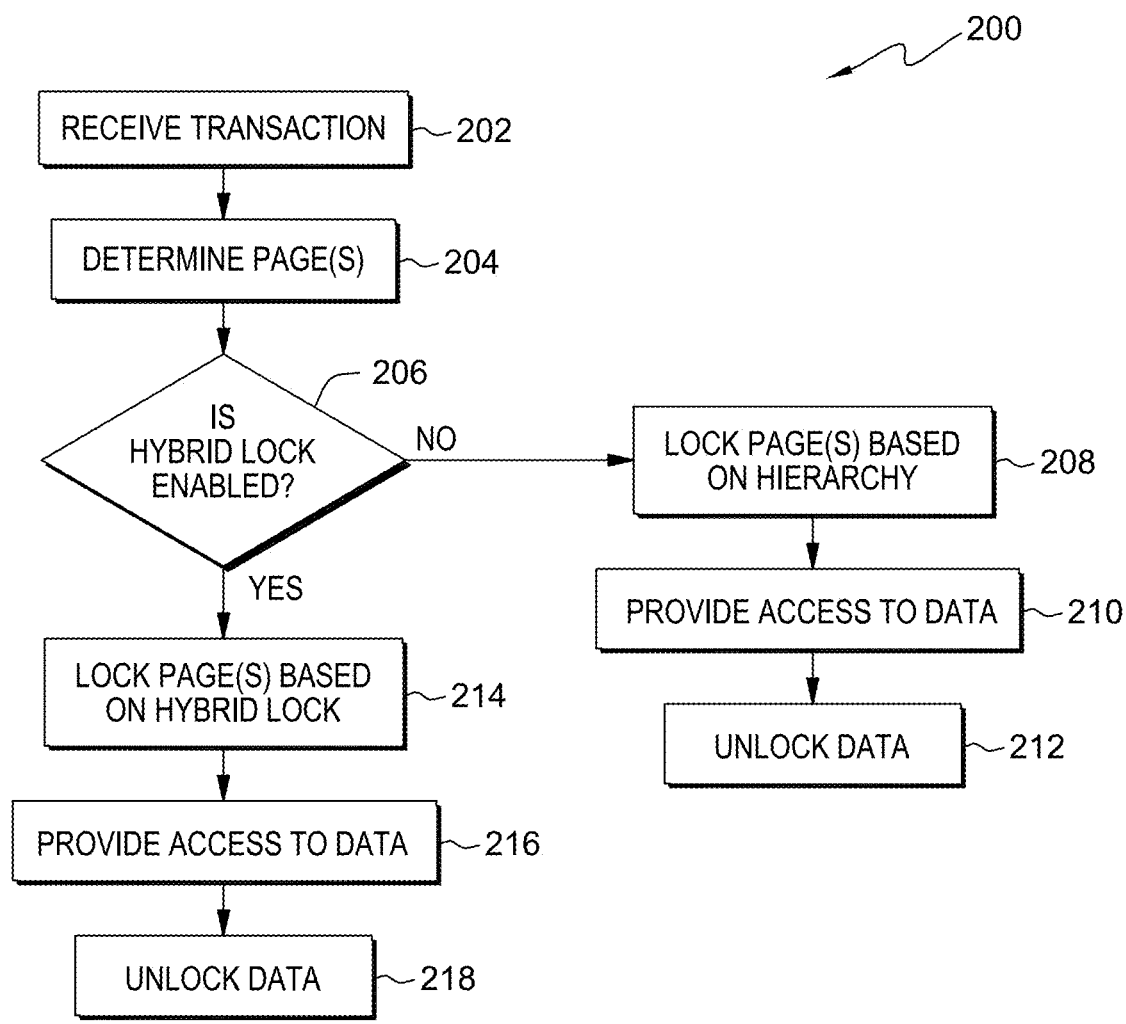
FIG. 2 is a flow chart diagram depicting operational steps for relational database management system 112 for hybrid locking content, in accordance with at least one embodiment of the invention.

FIG. 2 is a flow chart diagram of workflow 200 depicting operational steps for RDBMS 112 in accordance with at least one embodiment of the invention. In an alternative embodiment, the steps of workflow 200 may be performed by any other program, such as LMP 114, while working with RDBMS 112. It should be appreciated that embodiments of the present invention provide at least for hybrid locking in relational database systems. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting to make a transaction involving data found in RDBMS 112.

RDBMS 112 receives a transaction (step 202). At step 202, RDBMS 112 receives a transaction involving data managed by RDBMS 112. In an embodiment, the data may be found in information repository 116. In an embodiment, RDBMS 112 may receive the transaction from a user input via the user interface discussed above. In an alternative embodiment, RDBMS 112 may receive the transaction from the operating system of computing device 110 or any other program (not shown). In an embodiment, RDBMS 112 may receive a transaction that includes the use, change, read, write, edit, modify, etc. any that piece of data. In an embodiment, the data may be found in one or more pages managed by RDBMS 112 in information repository 116.

RDBMS 112 determines page(s) (step 204). At step 204, RDBMS 112 determines the one or more page(s) that need to be locked in order to access the data needed for the transaction of step 202. In an embodiment, if more than one page is needed in order to access the data needed for the transaction of step 202 then steps 206-218 are performed multiple time (i.e., once for each page). For example, RDBMS 112 may determine the page the data is found in using an index for the table or any other means known in the art.

RDBMS 112 determines whether the hybrid lock is enabled (decision step 206). At decision step 206, RDBMS 112 whether the page that stores the data has the hybrid lock enabled. In an embodiment, RDBMS 112 may communicate with LMP 114 in order to determine whether the hybrid lock is enabled for the page. In an alternative embodiment, RDBMS 112 may access information repository 116, and specifically the hybrid lock hash page(s) stored in information repository 116, to determine whether the hybrid lock is enabled for the page. In an embodiment, if hybrid lock is not enabled (decision step 206, no branch), processing proceeds to step 208. In an embodiment, if hybrid lock is enabled (decision step 206, yes branch), processing proceeds to step 214.

RDBMS 112 locks page(s) based on hierarchy (step 208). At step 208, RDBMS 112 determines the locking hierarchies for RDBMS 112. In an embodiment, locking hierarchies may be at the table-level, page-level, or row-level. In an embodiment, the locking hierarchies for each data location are stored in information repository 116. In an embodiment, RDBMS 112 determines, based on the determined page(s) of step 204, which page needs to be accessed to access the data. In an embodiment, RDBMS 112 determines the locking hierarchy for that page based on the locking hierarchies for each table that is stored in the information repository 116. In an embodiment, RDBMS 112 then locks the table, page or row based on the on the determined locking hierarchies for the table.

RDBMS 112 provides access to data (step 210). At step 210, RDBMS 112 allows the party involving the transaction in step 202 to access the data. In an embodiment, the party, a user or another program (not shown), may use, change, read, write, edit, modify, etc. any the data. In an embodiment, upon completion of the transaction, the party may notify RDBMS 112 of completion of the transaction. In an alternative embodiment, RDBMS 112 may provide access to the data for a time period. In yet another alternative embodiment, RDBMS 112 may provide access to the data until the data is modified.

RDBMS 112 unlocks data (step 212). At step 212, RDBMS 112 unlocks the table, page, or row that was locked in step 208 to access the data.

RDBMS 112 lock page(s) based on hybrid lock (step 214). At step 214, RDBMS 112 determines the locking for RDBMS 112 using the hybrid lock hashing table. In an embodiment, if the page(s) that have hybrid lock enabled based on the determination in decision step 206 and are above the "hot" page threshold on the hybrid lock hash page, then RDBMS 112 will provide row locking for the page(s). In other words, RDBMS 112 will lock the candidate row(s) of the qualifying page(s) that contain the data. In an embodiment, if the page(s) that have the hybrid lock enabled based on the determination in decision step 206 and are not above the "hot" page threshold on the hybrid lock hash page, then RDBMS 112 will provide page locking for the page(s). In other words, RDBMS 112 will lock the candidate page(s) of the qualifying page(s) that contain the data.

RDBMS 112 provides access to data (step 216). At step 216, RDBMS 112 allows the party involving the transaction in step 202 to access the data. In an embodiment, the party, a user or another program (not shown), may use, change, read, write, edit, modify, etc. any the data. In an embodiment, upon completion of the transaction, the party may notify RDBMS 112 of completion of the transaction. In an alternative embodiment, RDBMS 112 may provide access to the data for a time period. In yet another alternative embodiment, RDBMS 112 may provide access to the data until the data are modified.

RDBMS 112 unlocks data (step 218). At step 212, RDBMS 112 unlocks the table, page, or row that was locked in step 214 to access the data.

Figure 3:
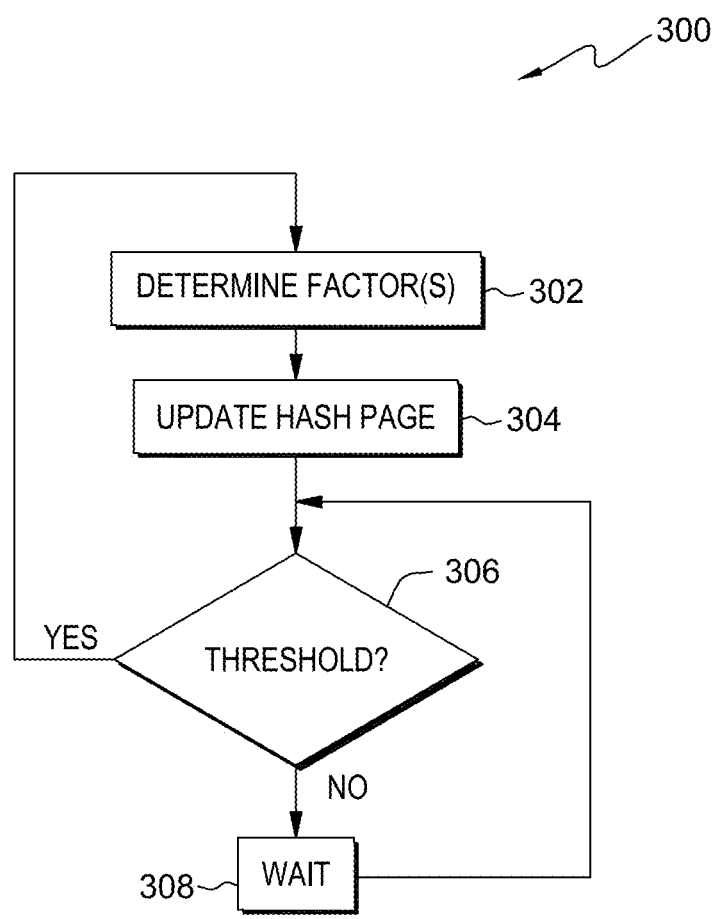
FIG. 3 is a flow chart diagram depicting operational steps for lock manager program 114 for hybrid locking content, in accordance with at least one embodiment of the invention.

FIG. 3 is a flow chart diagram of workflow 300 depicting operational steps for LMP 114 in accordance with at least one embodiment of the invention. In an alternative embodiment, the steps of workflow 200 may be performed by any other program, such as RDBMS 112, while working with LMP 114. It should be appreciated that embodiments of the present invention provide at least for managing a hybrid lock hash page. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 300 upon a user wanting a hybrid locking system for RDBMS 112. In an embodiment, the user via the user interface will indicate to RDBMS 112 and LMP 114 the tables/pages/rows to be included in the hybrid locking system.

LMP 114 determines factor(s) (step 302). At step 202, LMP 114 determines a plurality of factors that are used to rank pages on the hybrid lock hash page. In an embodiment, the plurality of factors include, but are not limited to, bufferpool residency time, number of transaction waiting for a given page, and amount of wait time for a given page. In an embodiment, the bufferpool residence time is the amount of time a page spends in the bufferpool, an area of memory that has been allocated by RDBMS 112 and/or the operating system for the purpose of caching table and index data as it is read from the disk. In an embodiment, the longer a page remains in the bufferpool, the more the page is in demand. In an embodiment, the number of transactions waiting for a given page is a count of the number of pages that want to access a page and the higher the count the more in demand the page is. In an embodiment, the amount of wait time for a given page is the amount of time a transaction must wait to receive access to the page and the larger the wait time the more in demand the page is. In an embodiment, LMP 114 may determine one, some, or all of the plurality of factors discussed above. In an embodiment, LMP 114 may determine the plurality of factors. In an alternative embodiment, LMP 114 may communicate with other programs (not shown), to determine the plurality of factors.

LMP 114 updates the hash page (step 304). At step 304, LMP 114 updates the hybrid lock hash page based on the determined factor(s) in step 302. In an embodiment, LMP 114 recalculates the rankings based on the updated determined factor(s) received in step 302. In an embodiment, LMP 114 may update the ranking for each factor(s) received in step 302. In an embodiment, LMP 114 may update the final ranking based on the weighting of the factor(s), discussed previously.

LMP 114 determines whether a threshold has occurred (decision step 306). At decision step 306, LMP 114 determines whether a threshold event occurs. In a first embodiment, the threshold may be time based. In other words, LMP 114 determines whether a threshold period of time has occurred. In a second embodiment, the threshold may be performance based. In other words, LMP 114 determines whether any of the factor(s) have changed a threshold amount. For example, has a factor increased or decreased over 10%? In a third embodiment, the threshold may be time based or performance based, in other words either factors can trigger a decision of yes or no in decision step 306. If LMP 114 determines a threshold has occurred (decision step 306, yes branch), processing proceeds to step 302. If LMP 114 determines a threshold has not occurred (decision step 306, no branch), processing proceeds to step 308.

LMP 114 waits (step 308). At step 308, LMP 114 waits for a period of time or event. In an embodiment, if the threshold is time based, LMP 114 waits a predetermined period of time before returning to step 306. In an embodiment, if the threshold is performance based, LMP 114 waits until a factor has decreased or increased a threshold amount before returning to step 306.

Figure 4:
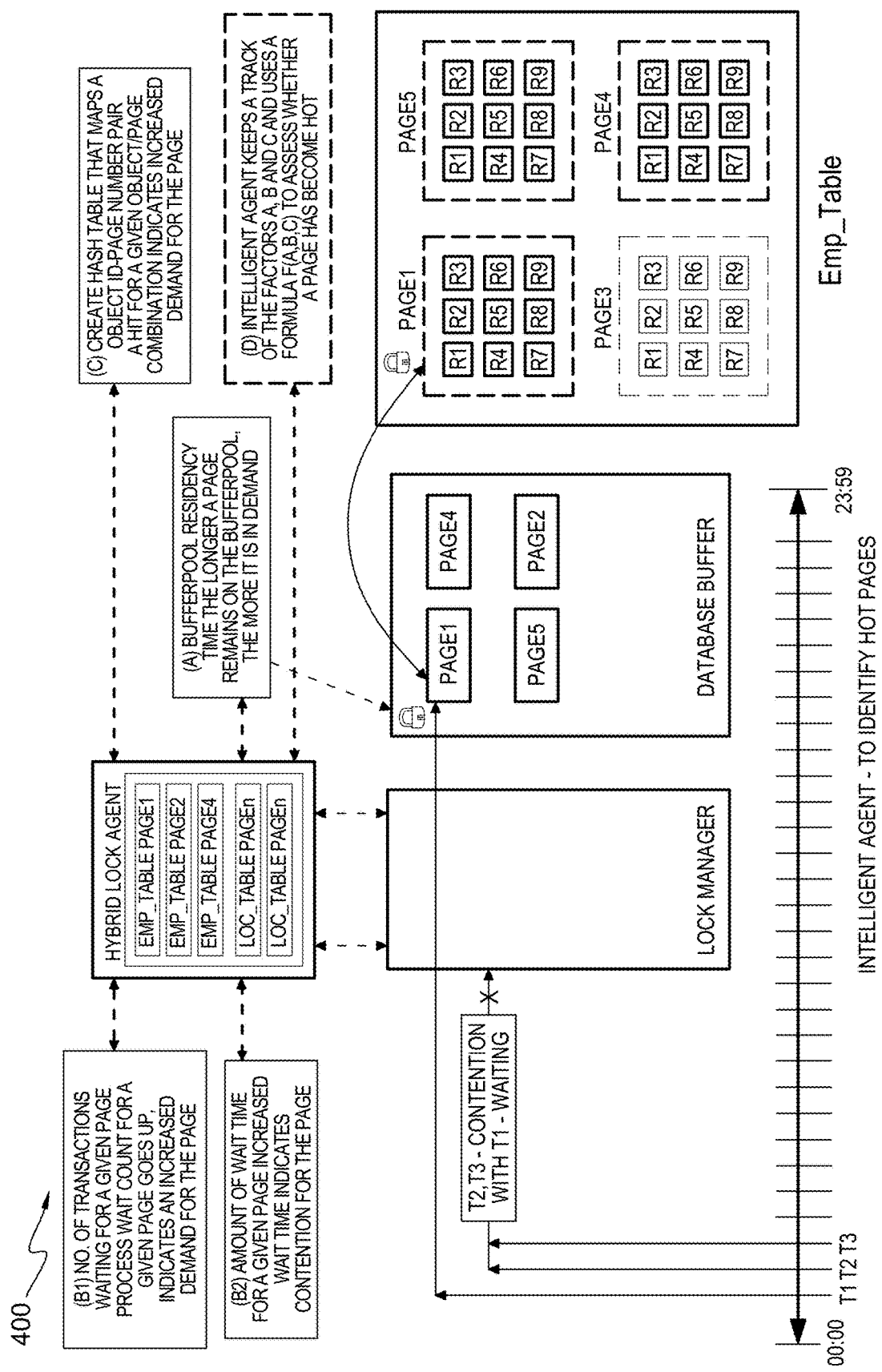
FIG. 4 is an overview of hybrid locking content in a relational database management system, in accordance with at least one embodiment of the invention.

FIG. 4 is an overview of hybrid locking content in a relational database management system 400, in accordance with at least one embodiment of the invention. As shown in FIG. 4, a lock manager (RDBMS 112) for managing access to the database. FIG. 4 includes a hybrid lock agent (LMP 114) for managing "hot" pages. FIG. 4 includes, for example a table called Emp_Table, that is found in information repository 116. As noted in FIG. 4, once RDBMS 112 identifies qualifying pages that contain candidate rows, RDBMS 112 communicates with the lock manager that in turn invokes the hybrid lock agent (LMP 114) to determine if the data is found on a page that is "hot". Database buffer is an area of main memory that has been allocated by the RDBMS for the purpose of caching table data. In FIG. 4, Section (A) Bufferpool residency time is the amount of time a page remains in the database buffer, and the more time the page is found in the database buffer the higher demand the page is, as discussed above. In FIG. 4, Section (B1) No. of transactions waiting for a given page is the process waiting count for a given page and as this page count goes up, there is more demand for the page, as discussed above. In FIG. 4, Section (B2) is the amount of wait time for a given page and as the wait time increases that means there is an increase in contention for the page, as discussed above. In FIG. 4, Section (C) discusses hybrid lock agent, LMP 114, creating a hash table in information repository 116 that is used to determine the number of hits for a given object/page combination and more hits means there is an increased demand for the page, as discussed above. In FIG. 4, Section (D) is the hybrid lock agent, LMP 114, ranking the pages based on the information in Section A, Section B, and Section C. As noted above, the threshold for "hot" pages can be set by a user.

Figure 5:
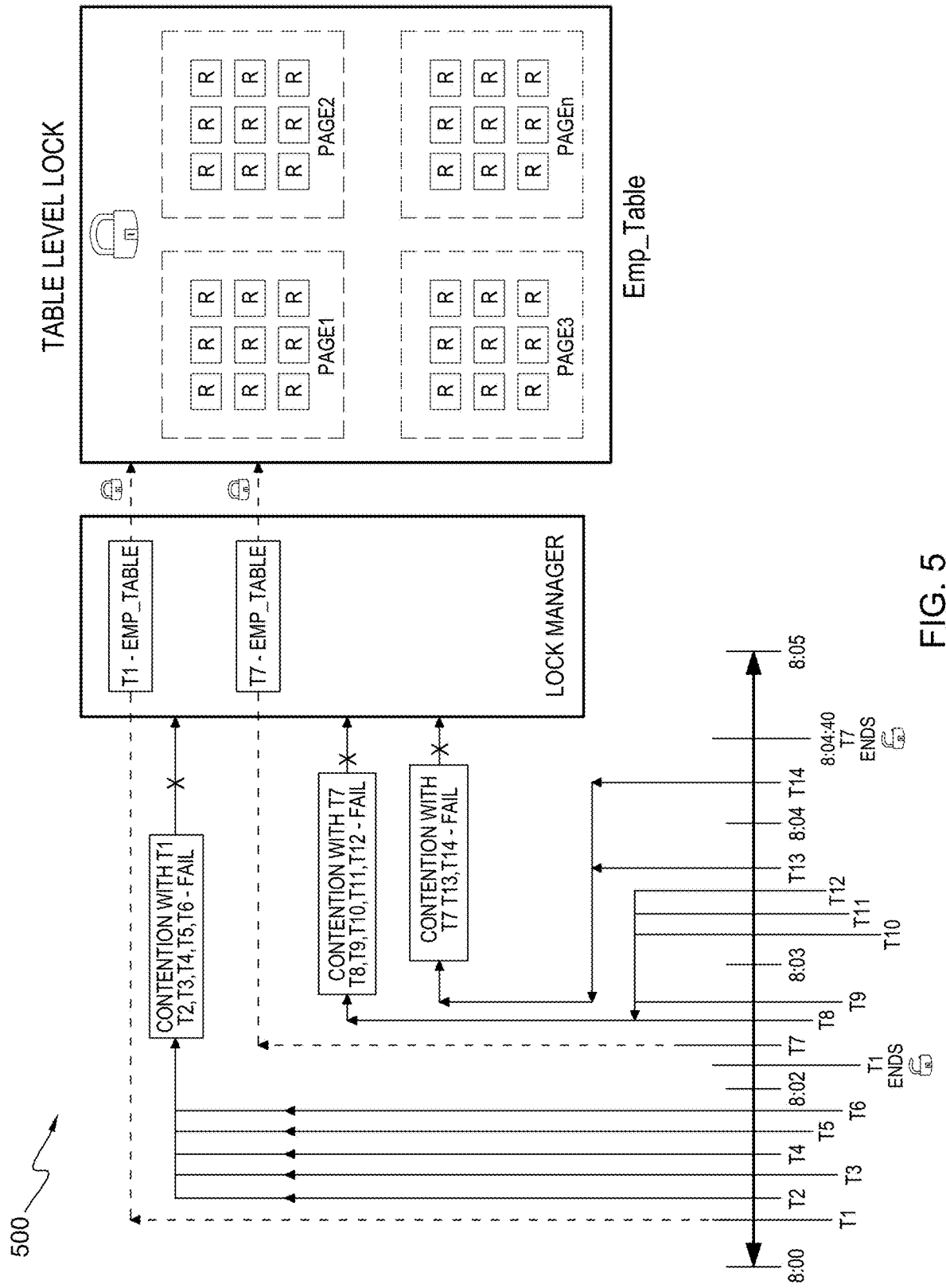
FIG. 5 is an example scenario of table-level locking content in a relational database management system, in accordance with at least one embodiment of the invention.
Figure 6:
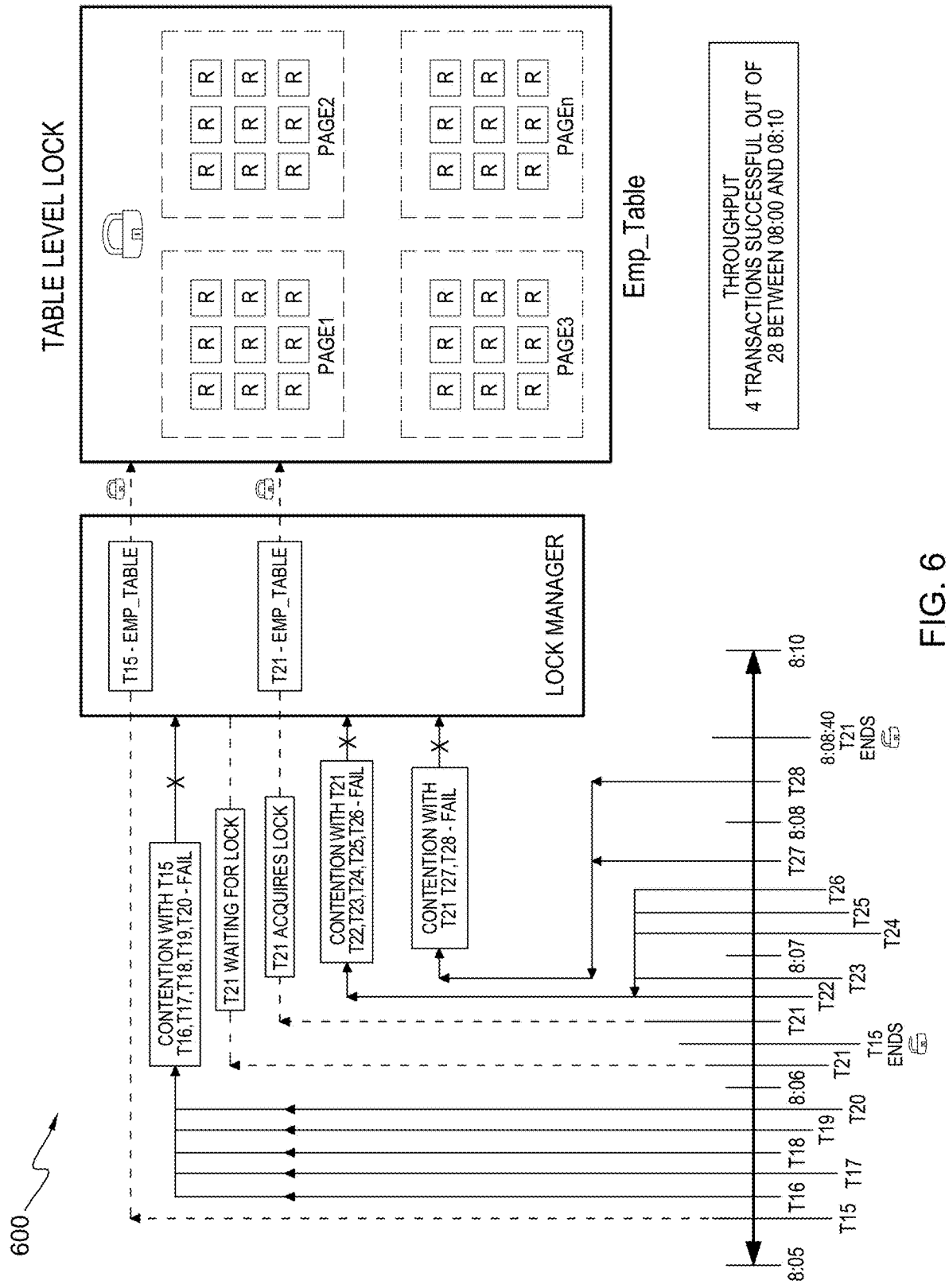
FIG. 6 is an example scenario of table-level locking content in a relational database management system, in accordance with at least one embodiment of the invention.

FIGS. 5 and 6 are an example scenario 500 in FIG. 5 and example scenario 600 in FIG. 6 of table-level locking content in a relational database management system. In this example, RDBMS 112 manages access to EMP_Table. In this example, at 08:00:40, transaction T1 occurs and acquires lock on EMP_Table to perform the transaction. The lock on EMP_Table is held until the completion of T1. Transaction T2, T3, T4, T5, and T6 are received by RDBMS 112, however they must wait to acquire the lock on EMP_Table in order to perform their transactions as EMP_Table is locked by T1. As T1 is actively occurring, T2, T3, T4, T5, and T6 wait for access to EMP_Table and the lock wait time threshold occurs, therefore T2, T3, T4, T5, and T6 fail. After 08:02, T1 completes the T1 transaction and releases the lock on EMP_Table. T7 is received by RDBMS 112, and since T1 has released the lock on EMP_Table and there are no other active waiting transactions (since T2-T6 failed due to passing the wait time threshold), T7 acquires the lock on EMP_Table and performs transaction T7. Transactions T8-T14 are received and wait for access to EMP_Table since EMP_Table is locked by T7. T8-T14 fail due to the lock wait time threshold being surpassed before the completion of T7 and release of the lock on EMP_Table. Between 08:00 and 08:05 there were 14 transactions received by RDBMS 112, two of them (T1 and T7) were able to acquire a lock on EMP_Table and twelve of them (T2-T6 and T8-T14) failed due to reaching lock wait time threshold.

Furthering this example, at 08:05:30, transaction T15 occurs and acquires lock on EMP_Table to perform the transaction. The lock on EMP_Table is held until the completion of T15. Transaction T16-T21 are received by RDBMS 112, however they must wait to acquire the lock on EMP_Table in order to perform their transactions. As T1 is actively occurring, T16-T21 wait for access to EMP_Table and the lock wait time threshold occurs, therefore T16-T20 fail. After 08:06, T15 completes the T15 transaction and releases the lock on EMP_Table. T21 has not failed due to the lock wait time threshold not occurring yet, and since T15 has released the lock on EMP_Table and there are no other active waiting transactions (since T16-T20 failed due to passing the wait time threshold), T21 acquires the lock on EMP_Table and performs transaction T21. Transactions T22-T28 are received and wait for access to EMP_Table since EMP_Table is locked by T21. T22-T28 fail due to the lock wait time threshold being surpassed before the completion of T21 and release of the lock on EMP_Table. Between 08:05 and 08:10 there were 14 transactions received by RDBMS 112, two of them (T15 and T21) were able to acquire a lock on EMP_Table and twelve of them (T16-T20 and T22-T28) failed due to reaching lock wait time threshold.

Figure 7:
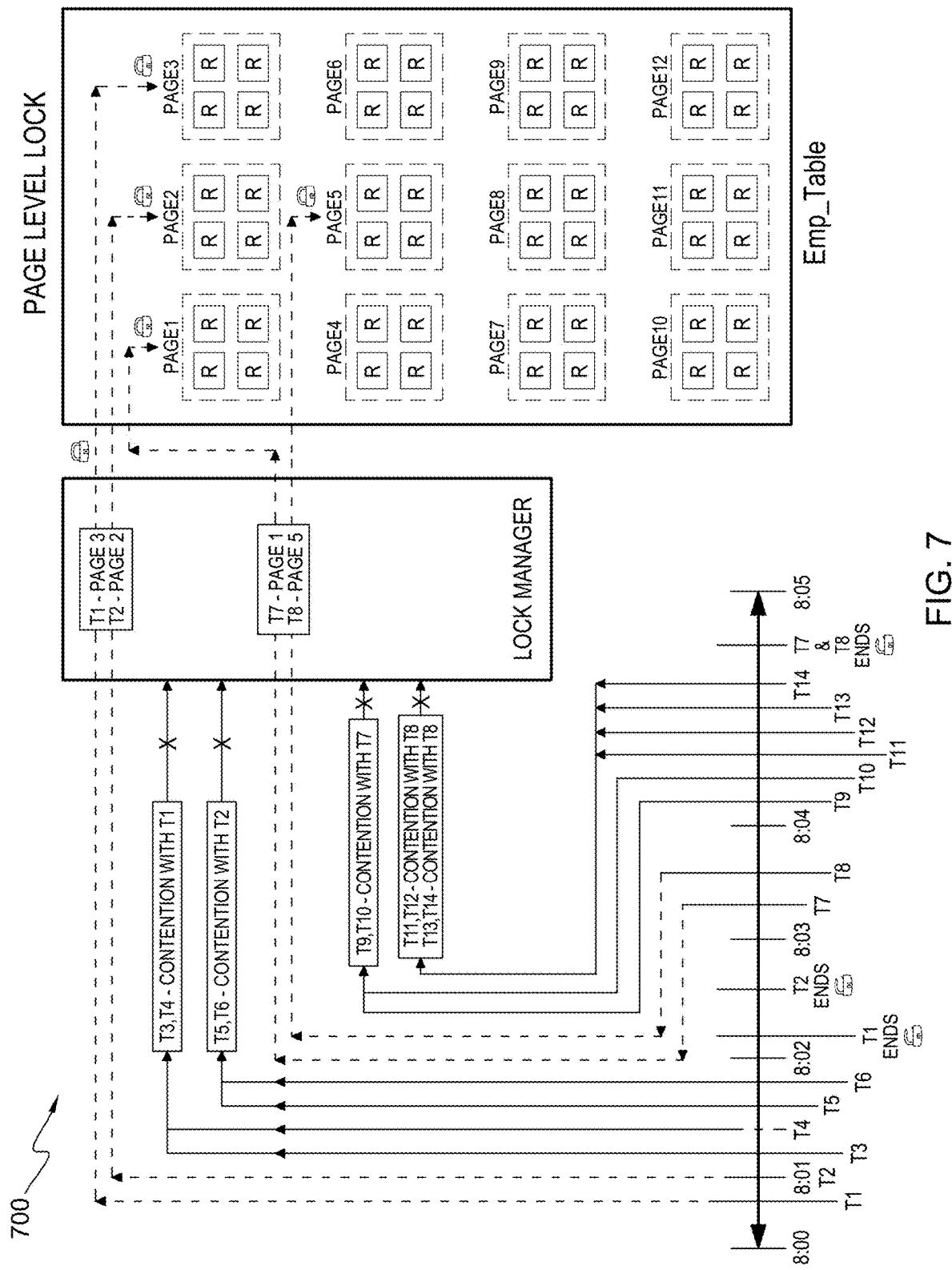
FIG. 7 is an example scenario of page-level locking content in a relational database management system, in accordance with at least one embodiment of the invention.
Figure 8:
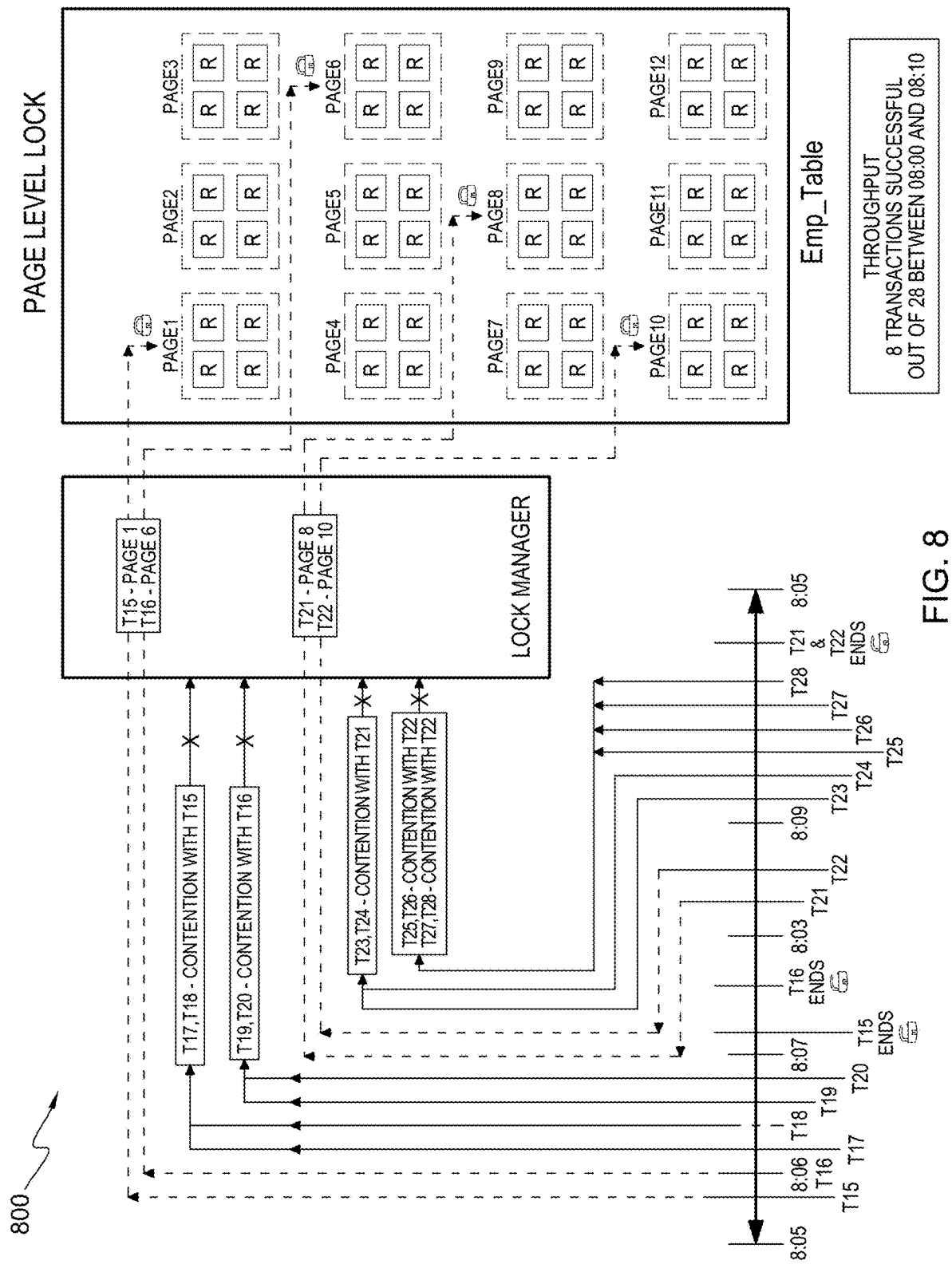
FIG. 8 is an example scenario of page-level locking content in a relational database management system, in accordance with at least one embodiment of the invention.

FIGS. 7 and 8 an example scenario 700 in FIG. 7 and example scenario 800 in FIG. 8 of page-level locking content in a relational database management system. In this example, RDBMS 112 manages access to EMP_Table. In this example, at 08:00:40, transaction T1 occurs and acquires lock on Page 3 of EMP_Table. The lock on Page 3 is held until the completion of T1. At 08:02, T2 is received and acquires lock on Page 2 of EMP_Table. The lock on Page 2 is held until the completion of T2. Transactions T3 and T4 are received by RDBMS 112, however they must wait to acquire the lock on Page 3 in order to perform their transactions as Page 3 is locked by T1. Transactions T5 and T6 are received by RDBMS 112, however they must wait to acquire the lock on Page 2 in order to perform their transactions as Page 2 is locked by T2. As T1 is actively occurring, T3 and T4 wait for access to Page 3 and the lock wait time threshold occurs, therefore T3 and T4 fail. As T2 is actively occurring, T5 and T6 wait for access to Page 2 and the lock wait time threshold occurs, therefore T5 and T6 fail. After 08:02, T1 and T2 complete successfully and release the lock on Page 3 and Page 2, respectively. T7 is received by RDBMS 112 and acquires lock on Page 1 of EMP_Table. The lock on Page 1 is held until the completion of T7. T8 is received by RDBMS 112 and acquires lock on Page 5 of EMP_Table. The lock on Page 5 is held until the completion of T8. Transactions T9 and T10 are received by RDBMS 112, however they must wait to acquire the lock on Page 1 in order to perform their transactions as Page 3 is locked by T7. Transactions T11-T14 are received by RDBMS 112, however they must wait to acquire the lock on Page 5 in order to perform their transactions as Page 5 is locked by T8. As T7 is actively occurring, T9 and T10 wait for access to Page 1 and the lock wait time threshold occurs, therefore T9 and T10 fail. As T8 is actively occurring, T11-T14 wait for access to Page 5 and the lock wait time threshold occurs, therefore T11-14 fail. At 08:04:40, T7 and T8 complete successfully and release the lock on Page 1 and Page 5, respectively. Between 08:00 and 08:05 there were 14 transactions received by RDBMS 112, four of them (T1, T2, T7 and T8) were able to acquire lock on their respective pages and ten of them (T3-T6 and T9-T14) failed due to reaching the lock wait time threshold.

Furthering this example, at 08:05:40, transaction T15 occurs and acquires lock on Page 1 of EMP_Table. The lock on Page 1 is held until the completion of T15. At 08:06, transaction T16 occurs and acquires lock on Page 6 of EMP_Table. The lock on Page 6 is held until the completion of T16. Transactions T17 and T18 are received by RDBMS 112, however they must wait to acquire the lock on Page 1 in order to perform their transactions as Page 1 is locked by T15. Transactions T19 and T20 are received by RDBMS 112, however they must wait to acquire the lock on Page 6 in order to perform their transactions as Page 6 is locked by T16. As T15 is actively occurring, T17 and T18 wait for access to Page 1 and the lock wait time threshold occurs, therefore T17 and T18 fail. As T16 is actively occurring, T19 and T20 wait for access to Page 6 and the lock wait time threshold occurs, therefore T19 and T20 fail. After 08:07, T15 and T16 complete successfully and release the lock on Page 1 and Page 6, respectively. T21 is received by RDBMS 112 and acquires lock on Page 8 of EMP_Table. The lock on Page 8 is held until the completion of T21. T22 is received by RDBMS 112 and acquires lock on Page 10 of EMP_Table. The lock on Page 10 is held until the completion of T22. Transactions T23 and T24 are received by RDBMS 112, however they must wait to acquire the lock on Page 8 in order to perform their transactions as Page 8 is locked by T21. Transactions T25-T28 are received by RDBMS 112, however they must wait to acquire the lock on Page 10 in order to perform their transactions as Page 10 is locked by T22. As T21 is actively occurring, T23 and T24 wait for access to Page 8 and the lock wait time threshold occurs, therefore T23 and T24 fail. As T22 is actively occurring, T25-T28 wait for access to Page 10 and the lock wait time threshold occurs, therefore T25-T28 fail. At 08:09:40, T21 and T2 complete successfully and release the lock on Page 8 and Page 10, respectively. Between 08:05 and 08:10 there were 14 transactions received by RDBMS 112, four of them (T15, T16, T21, and T22) were able to acquire lock on their respective pages and ten of them (T17-T20 and T24-T28) failed due to reaching the lock wait time threshold.

Figure 9:
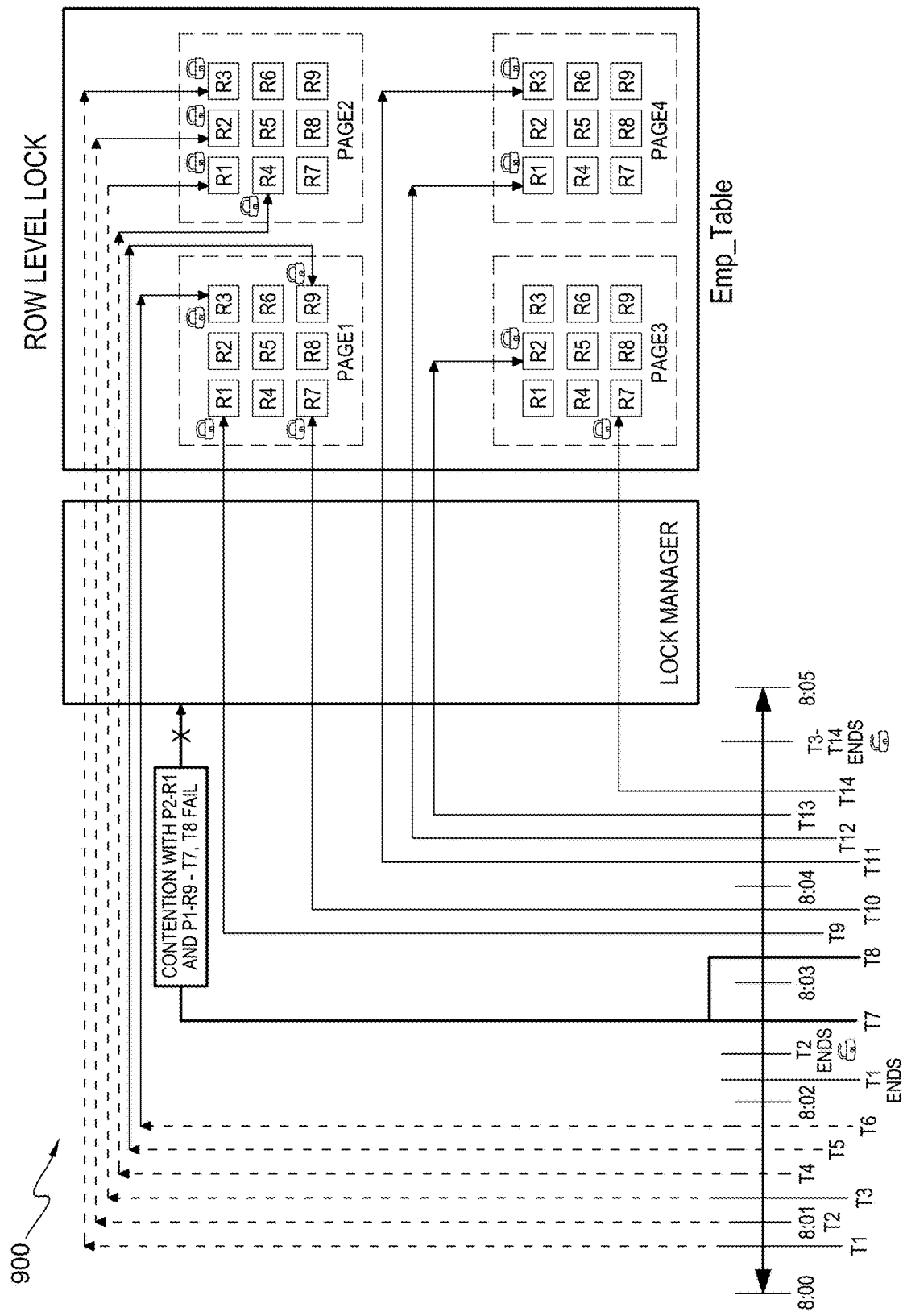
FIG. 9 is an example scenario of row-level locking content in a relational database management system, in accordance with at least one embodiment of the invention.
Figure 10:
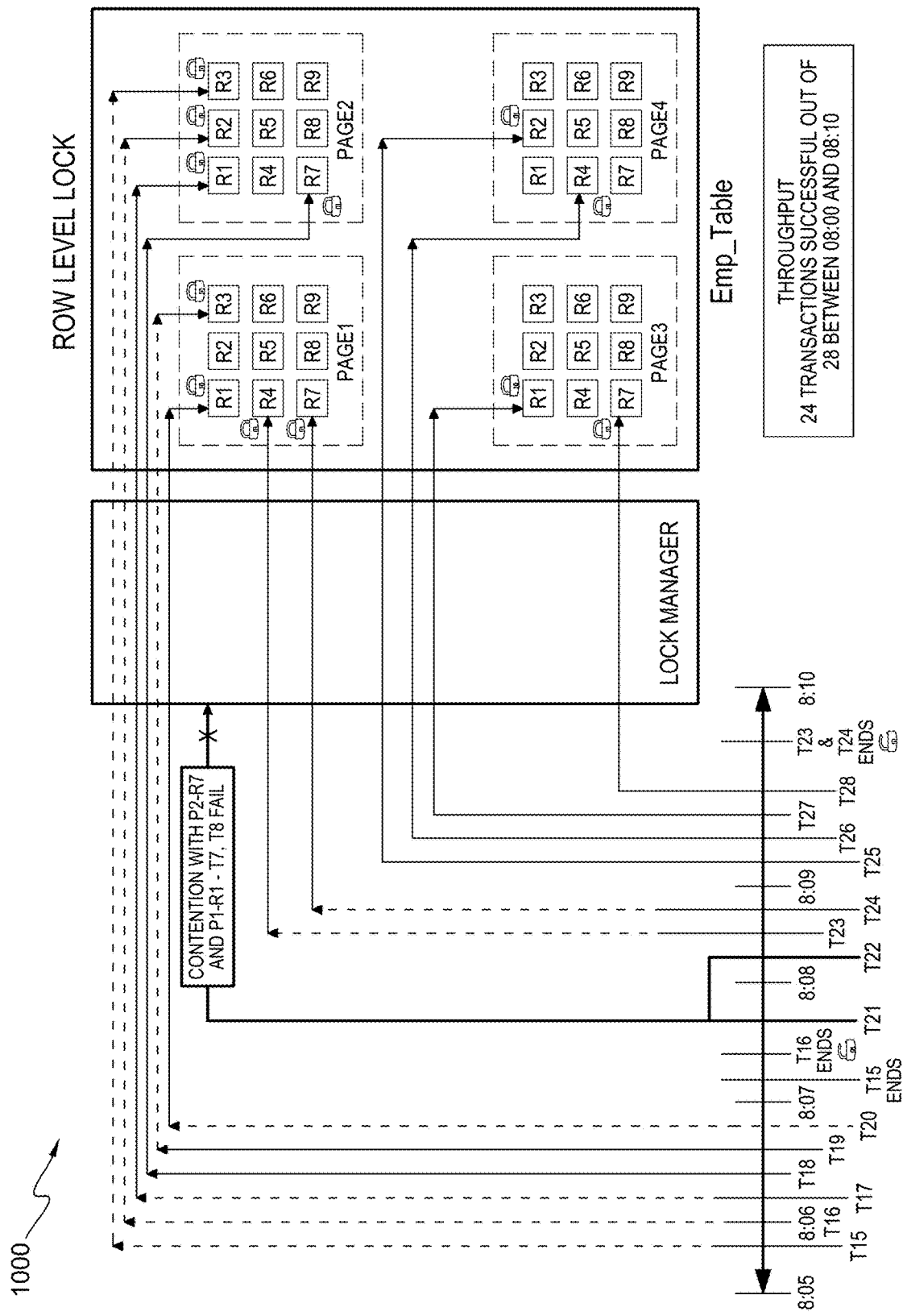
FIG. 10 is an example scenario of row-level locking content in a relational database management system, in accordance with at least one embodiment of the invention.

FIGS. 9 and 10 an example scenario 900 in FIG. 9 and example scenario 1000 in FIG. 10 of row-level locking content in a relational database management system. In this example, RDBMS 112 manages access to EMP_Table. In this example, at 08:00:40, transaction T1 occurs and acquires lock on Row 3 of Page 2 of EMP_Table. The lock on Row 3 of Page 2 is held until the completion of T1. At 08:02, T2 is received and acquires lock on Row 2 of Page 2 of EMP_Table. The lock on Row 2 Page 2 is held until the completion of T2. Transaction T3 occurs and acquires lock on Row 1 of Page 2 of EMP_Table. The lock on Row 1 of Page 2 is held until the completion of T3. Transaction T4 occurs and acquires lock on Row 4 of Page 2 of EMP_Table. The lock on Row 4 of Page 2 is held until the completion of T4. Transactions T5 occurs and acquires lock on Row 9 of Page 1 of EMP_Table. The lock on Row 9 of Page 1 is held until the completion of T5. Transaction T6 occurs and acquires lock on Row 3 of Page 1 of EMP_Table. The lock on Row 3 of Page 1 is held until the completion of T6. After 08:02, T1 and T2 complete successfully and release the lock on Row 3 of Page 2 and Row 2 of Page 2, respectively. T7 is received by RDBMS 112, however T7 must wait to acquire the lock on Row 1 of Page 2 which is held by T3. As T3 is actively occurring, T7 waits and the lock wait time threshold occurs, therefore T7 fails. T8 is received by RDBMS 112, however T8 must wait to acquire the lock on Row 9 of Page 9 which is held by T5. As T5 is actively occurring, T8 waits and the lock wait time threshold occurs, therefore T8 fails. Transaction T9 occurs and acquires lock on Row 1 of Page 1 of EMP_Table. The lock on Row 1 of Page 1 is held until the completion of T9. Transaction T10 occurs and acquires lock on Row 7 of Page 1 of EMP_Table. The lock on Row 7 of Page 1 is held until the completion of T10. Transaction T11 occurs and acquires lock on Row 3 of Page 4 of EMP_Table. The lock on Row 3 of Page 4 is held until the completion of T11. Transaction T12 occurs and acquires lock on Row 1 of Page 4 of EMP_Table. The lock on Row 1 of Page 4 is held until the completion of T12. Transaction T13 occurs and acquires lock on Row 2 of Page 3 of EMP_Table. The lock on Row 2 of Page 3 is held until the completion of T13. Transaction T14 occurs and acquires lock on Row 7 of Page 3 of EMP_Table. The lock on Row 7 of Page 3 is held until the completion of T14. At 08:04:40 T3-T14 complete successfully and release their respective locks. Between 08:00 and 08:05 there were 14 transactions received by RDBMS 112, twelve of them (T1-T6 and T9-T14) were able to acquire lock on their respective rows and ten of them (T7 and T8) failed due to reaching the lock wait time threshold.

Furthering this example, at 08:05:40, transaction T15 occurs and acquires lock on Row 3 of Page 2 of EMP_Table. The lock on Row 3 of Page 2 is held until the completion of T15. At 08:06, T16 is received and acquires lock on Row 2 of Page 2 of EMP_Table. The lock on Row 2 Page 2 is held until the completion of T16. Transaction T17 occurs and acquires lock on Row 1 of Page 2 of EMP_Table. The lock on Row 1 of Page 2 is held until the completion of T17. Transaction T18 occurs and acquires lock on Row 7 of Page 2 of EMP_Table. The lock on Row 7 of Page 2 is held until the completion of T18. Transactions T19 occurs and acquires lock on Row 9 of Page 1 of EMP_Table. The lock on Row 3 of Page 1 is held until the completion of T19. Transaction T20 occurs and acquires lock on Row 1 of Page 1 of EMP_Table. The lock on Row 1 of Page 1 is held until the completion of T20. After 08:07, T15 and T16 complete successfully and release the lock on Row 3 of Page 2 and Row 2 of Page 2, respectively. T21 is received by RDBMS 112, however T21 must wait to acquire the lock on Row 7 of Page 2 which is held by T18. As T18 is actively occurring, T21 waits and the lock wait time threshold occurs, therefore T21 fails. T22 is received by RDBMS 112, however T22 must wait to acquire the lock on Row 1 of Page 1 which is held by T20. As T20 is actively occurring, T22 waits and the lock wait time threshold occurs, therefore T22 fails. Transaction T23 occurs and acquires lock on Row 4 of Page 1 of EMP_Table. The lock on Row 4 of Page 1 is held until the completion of T23. Transaction T24 occurs and acquires lock on Row 7 of Page 1 of EMP_Table. The lock on Row 7 of Page 1 is held until the completion of T24. Transaction T25 occurs and acquires lock on Row 2 of Page 4 of EMP_Table. The lock on Row 2 of Page 4 is held until the completion of T25. Transaction T26 occurs and acquires lock on Row 4 of Page 4 of EMP_Table. The lock on Row 4 of Page 4 is held until the completion of T26. Transaction T27 occurs and acquires lock on Row 1 of Page 3 of EMP_Table. The lock on Row 1 of Page 3 is held until the completion of T27. Transaction T28 occurs and acquires lock on Row 7 of Page 3 of EMP_Table. The lock on Row 7 of Page 3 is held until the completion of T28. At 08:09:40 T23 and T24 complete successfully and release their respective locks. Between 08:05 and 08:10 there were 14 transactions received by RDBMS 112, twelve of them (T15-T20 and T23-T28) were able to acquire lock on their respective rows and ten of them (T21 and T22) failed due to reaching the lock wait time threshold.

Figure 11:
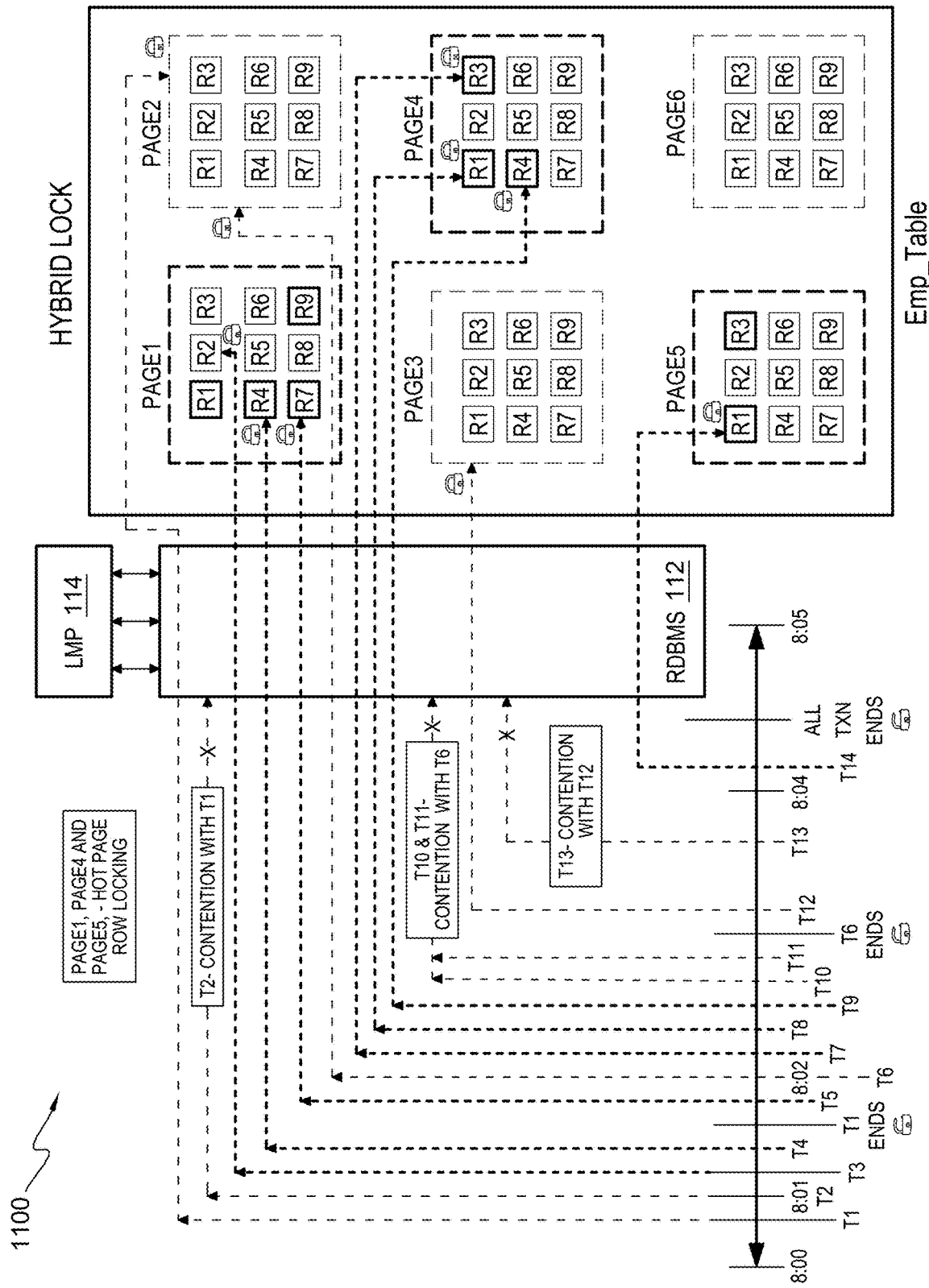
FIG. 11 is an example scenario of hybrid locking content in a relational database management system, in accordance with at least one embodiment of the invention.
Figure 12:
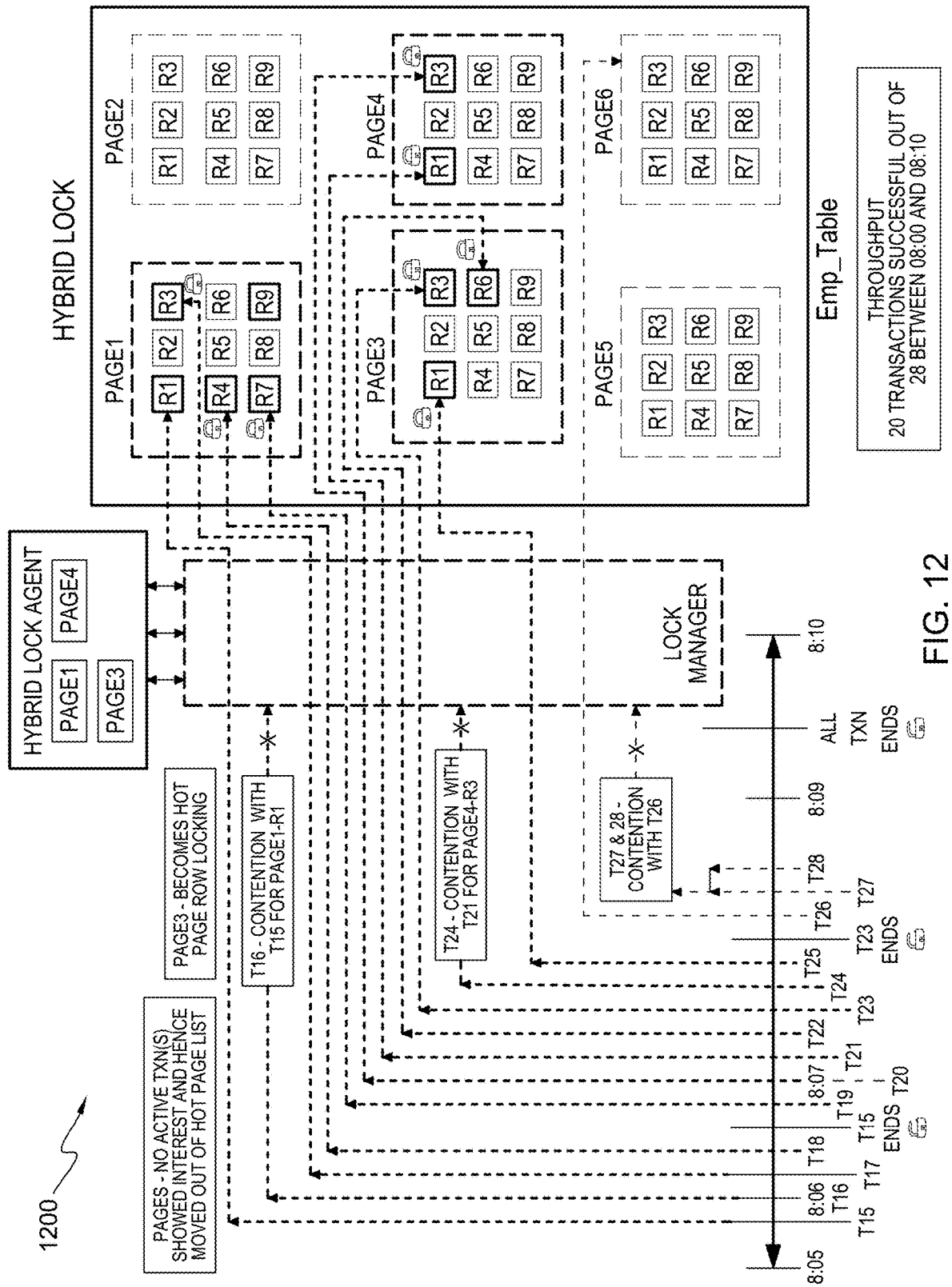
FIG. 12 is an example scenario of hybrid locking content in a relational database management system, in accordance with at least one embodiment of the invention.

FIGS. 11 and 12 an example scenario 1100 in FIG. 11 and example scenario 1200 in FIG. 12 of hybrid locking content in a relational database management system, in accordance with at least one embodiment of the invention. In this example, the table (Emp_Table) has a hybrid locking system implemented, as discussed above. Therefore, Emp_Table is managed by RDBMS 112 and/or LMP 114.

In this example, page 1, page 4, and page 5 are marked as hot pages by LMP 114 thus row level locking is enabled on these pages in order to promote concurrency and page 2, page 3, and page 6 continue to use hierarchical page level locking. At 08:00:40 T1 required a page level lock on page 2. The page level lock on page 2 is held until completion of T1. At 08:01 T2 requires data on page 2, however page 2 is already locked by T1. T2 will wait for the completion of T1 to acquire the data on page 2 unless T2 reaches the lock wait threshold time, in which then T2 will fail. T3 and T4 occur and require access to Page 1. Since page 1 is a hot page, row level locking occurs so T3 and T4 can acquire row level locks on Row 2 and Row 4, respectively, therefore both T3 and T4 can occur at the same time. T5 occurs to access Row 7 on page 1, and since page 1 is a hot page, Row 7 is row locked and T5 can proceed. At 08:02, T6 occurs and acquires a page level lock on page 2 since page 2 is not a hot page. T7, T8, T9 then occur and since they are accessing page 4, which is a hot page, they can each acquire row level locks on Row 3, Row 1, and Row 4, respectively. T10 and T11 then occur, however they must wait to acquire a lock on page 2 which is still held by T6. Similar to the scenario for T2, T10 and T11 will wait for the completion of T6 to acquire a lock on page 2, however if T10 and T11 reach the lock wait threshold time before access of page 2, then T10 and T11 will fail. T12 occurs and acquires a page level lock on page 3. T13 occurs and must wait to acquire a lock on page 3 which is already held by T12. Similar to the scenario for T13 will wait for the completion of T12 to acquire a lock on page 3, however if T13 reaches the lock wait threshold time before access of page 3, then T13 will fail. T14 occurs and accesses page 5, which is a hot page, so row level locking occurs on R1. At 08:04:40, all active transactions have completed and locks are released. Between 08:00 and 08:05 there were 14 transactions received by RDBMS 112, ten of them (T1, T3-T9, T12, and 14) were able to acquire lock on their respective pages and four of them (T2, T10, T11, and T13) failed due to reaching the lock wait time threshold.

Furthering this example, based on analysis done by LMP 114, page 1, page 3, and page 4 are now marked as hot pages by LMP 114 thus row level locking is enabled on these pages in order to promote concurrency and page 2, page 5, and page 6 continue to use hierarchical page level locking. LMP 114 makes this determination due to the increased use of data on page 3 and decreased use of data on page 5. At 08:05:40 T15 required a row level lock on page 1 because Page 1 is a "hot" page. The row 1 page 1 lock is held until completion of T15. At 08:06 T16 requires row 1 page 1 lock, however row 1 page 1 is already locked by T15. T5 will wait for the completion of T6 to acquire the data of row 1 page 1 however the lock wait time threshold is met before T15 completes, therefore T16 fails. T17 and T18 occur and require access to Page 1. Since page 1 is a hot page, row level locking occurs so T17 and T18 can acquire row level locks on Row 3 and Row 4, respectively, therefore both T17 and T18 can occur at the same time. T15 completes and releases the lock on Row 1 Page 1. T19 occurs to access Row 7 on page 1, and since page 1 is a hot page, Row 7 is row locked and T19 can proceed. At 08:07, T20 and T21 occur and require access to Page 4. Since page 4 is a hot page, row level locking occurs so T20 and T21 can acquire row level locks on Row 3 and Row 1, respectively, therefore both T20 and T21 can occur at the same time. T22 and T23 occur and require access to page 3. Since page 3 is a hot page, row level locking occurs so T22 and T23 can acquire row level locks on Row 6 and Row 3, respectively, therefore both T22 and T23 can occur at the same time. T24 occurs and must wait to acquire a lock on row 3 page 3 which is already held by T23. T25 occurs and requires access to page 3. Since page 3 is a hot page, row level locking occurs so T25 acquires row level locks on row 1 page 3. T23 completes successfully and releases row 1 page 3 lock. T26 occurs and requires a page level lock on page 6 since page 6 is not a hot page. T27 and T28 occur and require a page level lock on page 6 which is already held by T26. As T26 is actively occurring, T27 and T28 wait for access to Page 6 and the lock wait time threshold occurs, therefore T27 and T28 fail. Between 08:05 and 08:10 there were 14 transactions received by RDBMS 112, eleven of them (T15 and T17-T26) were able to acquire lock on their respective pages and three of them (T16, T27, and T28) failed due to reaching the lock wait time threshold.

Figure 13:
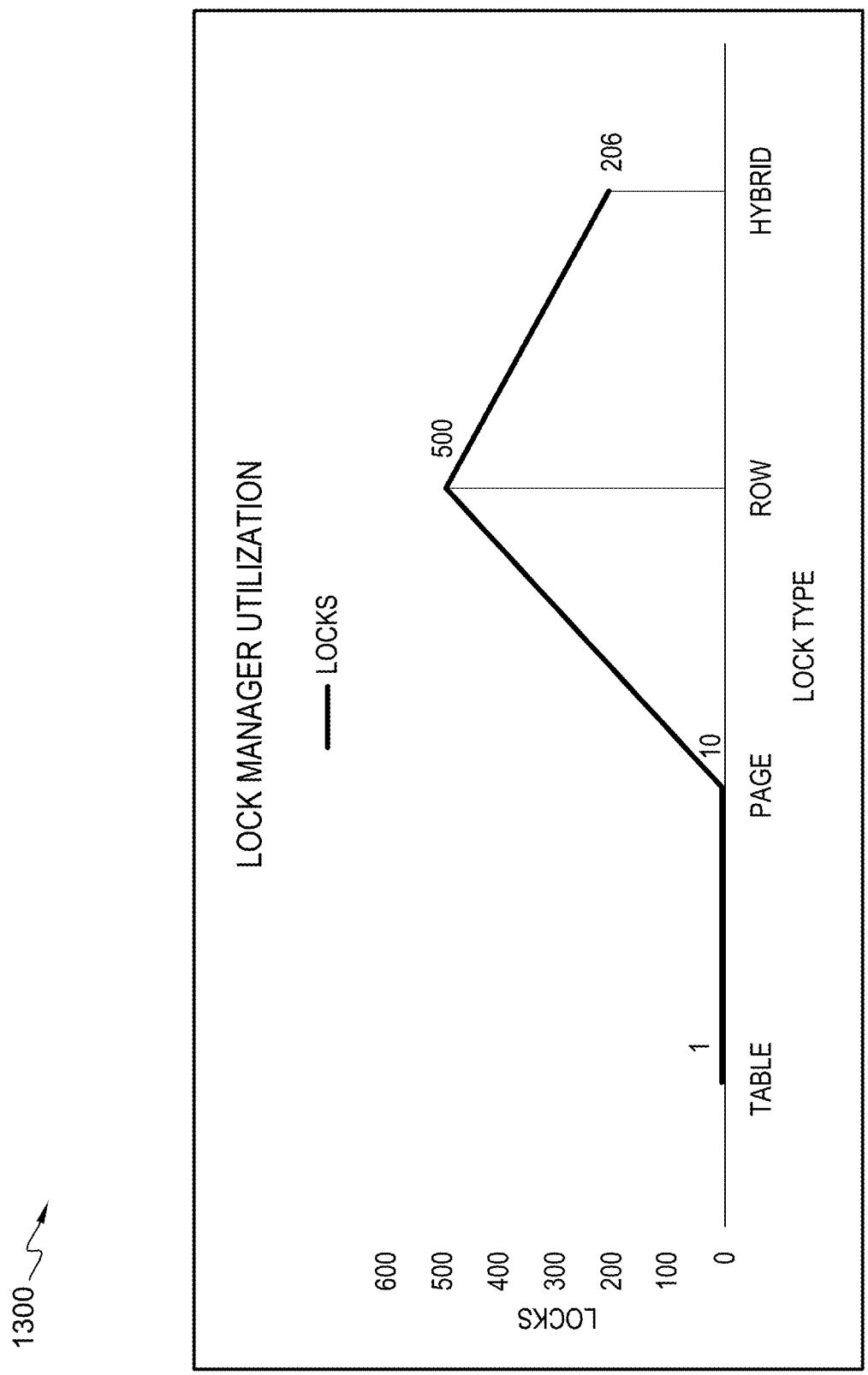
FIG. 13 is an example of lock resource utilization in a relational database management system, in accordance with at least one embodiment of the invention.

FIG. 13 is an example 1300 of lock resource utilization in a relational database management system, in accordance with at least one embodiment of the invention. This data is discussed in reference to FIGS. 5-12. As shown in FIG. 13, when utilizing a table locking scheme there is only one lock and that is for the table. Further, when utilizing a page locking scheme there are ten locks, one for each page as there are ten pages in the table. Even further, when utilizing a row locking scheme there are five hundred locks, fifty for each page and there are ten pages. Finally, when using a hybrid locking scheme, there are two hundred and six locks utilized.

Figure 14:
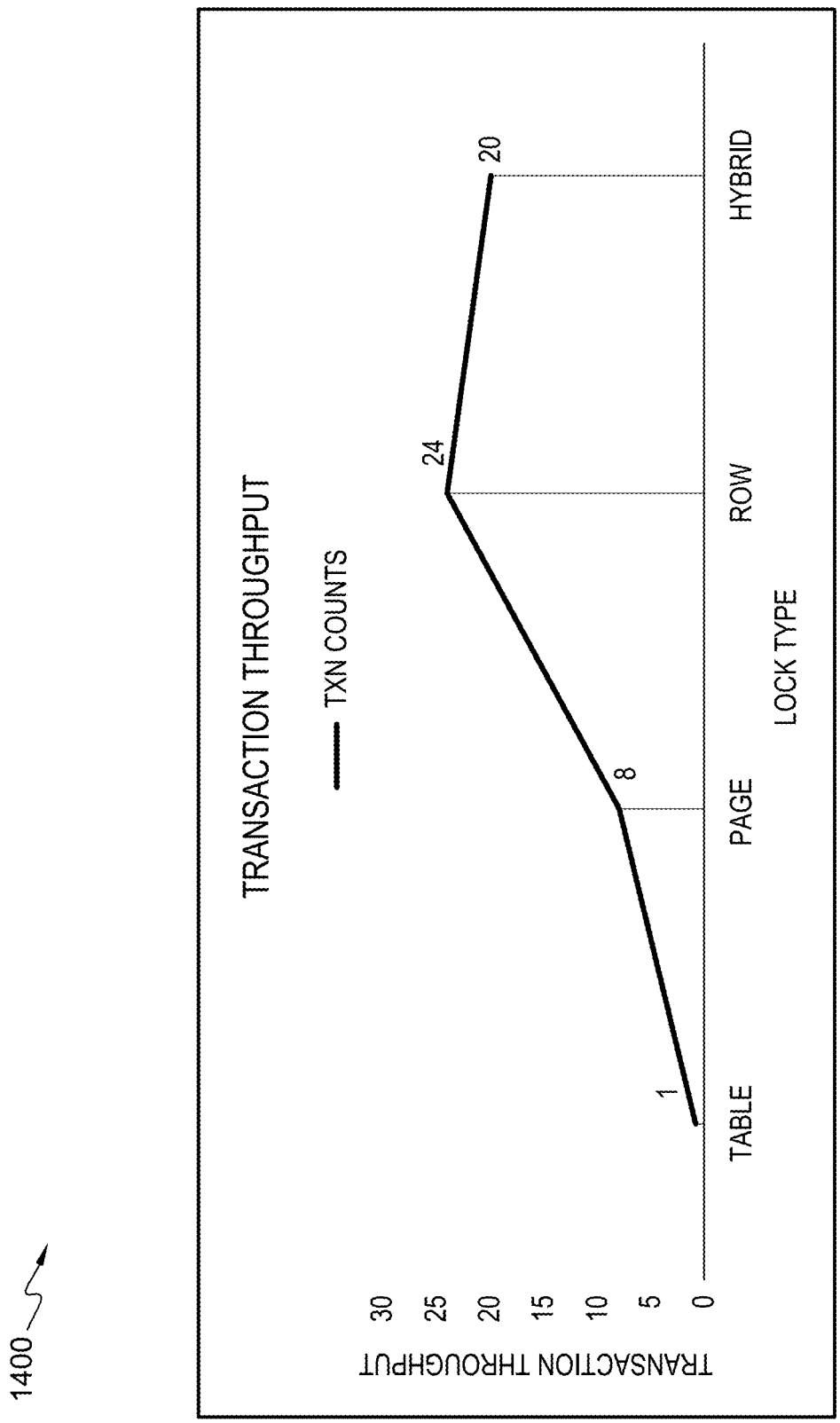
FIG. 14 is an example of transaction throughput in a relational database management system, in accordance with at least one embodiment of the invention.

FIG. 14 is an example 1400 of transaction throughput in a relational database management system, in accordance with at least one embodiment of the invention. This data is discussed in reference to FIGS. 5-12. As shown in FIG. 14, when utilizing a table locking scheme there are four successful transactions. Further, when utilizing a page locking scheme there are eight successful transactions. Even further, when utilizing a row locking scheme there are twenty four successful transactions. Finally, when using a hybrid locking scheme, there are twenty successful transactions.

Figure 15:
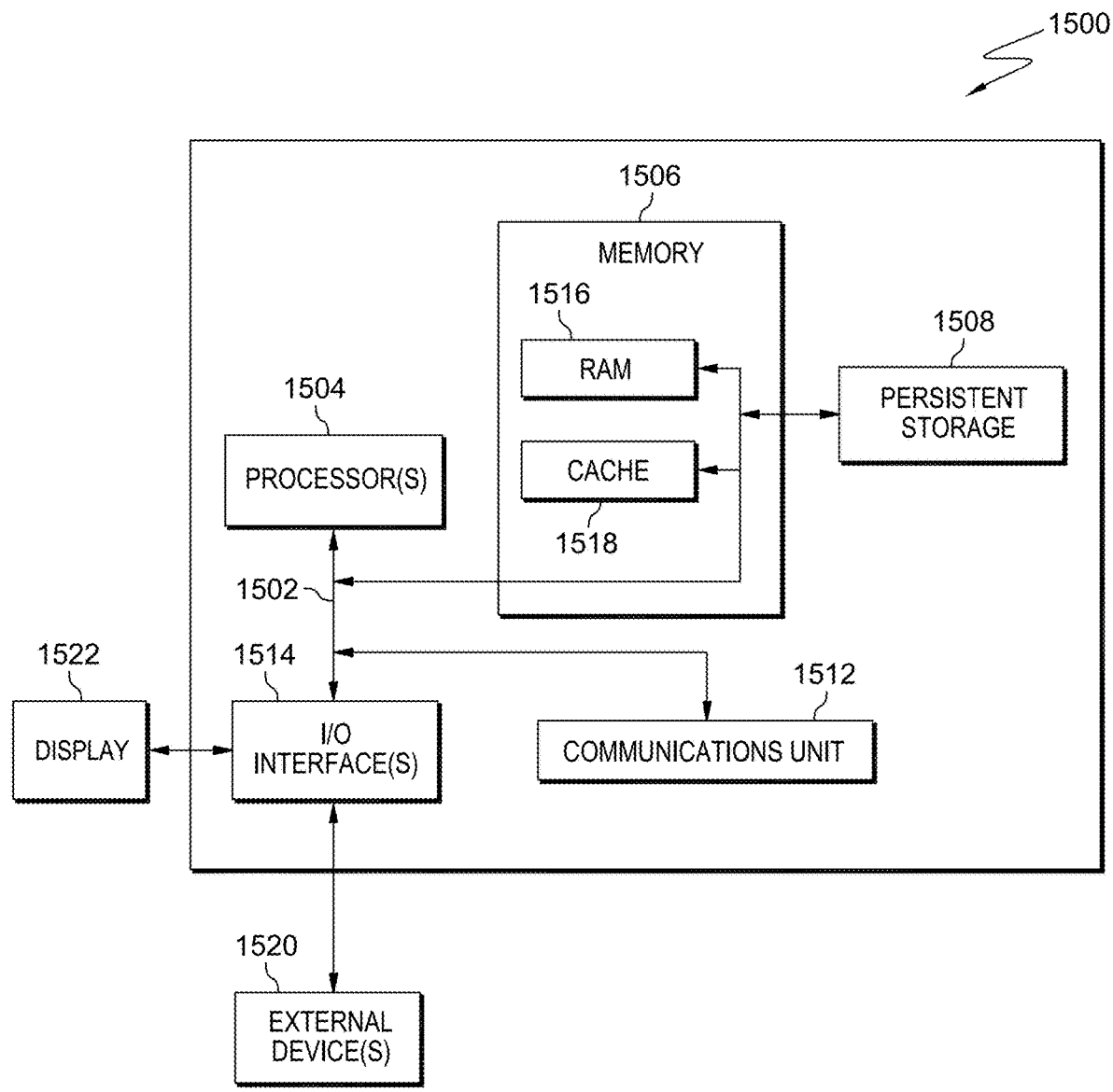
FIG. 15 is a block diagram depicting components of a computer, generally designated 1500, suitable for executing relational database management system 112 and lock manager program 114, in accordance with at least one embodiment of the invention.

FIG. 15 is a block diagram depicting components of a computer 1500 suitable for RDBMS 112 and LMP 114, in accordance with at least one embodiment of the invention. FIG. 15 displays the computer 1500, one or more processor(s) 1504 (including one or more computer processors), a communications fabric 1502, a memory 1506 including, a RAM 1516, and a cache 1518, a persistent storage 1508, a communications unit 1512, I/O interfaces 1514, a display 1522, and external devices 1520. It should be appreciated that FIG. 15 provides only an illustration of one embodiment and does not imply any limitations with regard to the environments in which different embodiments may be implemented. Many modifications to the depicted environment may be made.

As depicted, the computer 1500 operates over the communications fabric 1502, which provides communications between the computer processor(s) 1504, memory 1506, persistent storage 1508, communications unit 1512, and input/output (I/O) interface(s) 1514. The communications fabric 1502 may be implemented with an architecture suitable for passing data or control information between the processors 1504 (e.g., microprocessors, communications processors, and network processors), the memory 1506, the external devices 1520, and any other hardware components within a system. For example, the communications fabric 1502 may be implemented with one or more buses.

The memory 1506 and persistent storage 1508 are computer readable storage media. In the depicted embodiment, the memory 1506 comprises a random-access memory (RAM) 1516 and a cache 1518. In general, the memory 1506 may comprise any suitable volatile or non-volatile one or more computer readable storage media.

Program instructions for RDBMS 112 and LMP 114 may be stored in the persistent storage 1508, or more generally, any computer readable storage media, for execution by one or more of the respective computer processors 1504 via one or more memories of the memory 1506. The persistent storage 1508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 1508 may also be removable. For example, a removable hard drive may be used for persistent storage 1508. Other examples include optical and magnetic disks, thumb drives, and smart cards that are inserted into a drive for transfer onto another computer readable storage medium that is also part of the persistent storage 1508.

The communications unit 1512, in these examples, provides for communications with other data processing systems or devices. In these examples, the communications unit 1512 may comprise one or more network interface cards. The communications unit 1512 may provide communications through the use of either or both physical and wireless communications links. In the context of some embodiments of the present invention, the source of the various input data may be physically remote to the computer 1500 such that the input data may be received, and the output similarly transmitted via the communications unit 1512.

The I/O interface(s) 1514 allow for input and output of data with other devices that may operate in conjunction with the computer 1500. For example, the I/O interface 1514 may provide a connection to the external devices 1520, which may be as a keyboard, keypad, a touch screen, or other suitable input devices. External devices 1520 may also include portable computer readable storage media, for example thumb drives, portable optical or magnetic disks, and memory cards. Software and data used to practice embodiments of the present invention may be stored on such portable computer readable storage media and may be loaded onto the persistent storage 1508 via the I/O interface(s) 1514. The I/O interface(s) 1514 may similarly connect to a display 1522. The display 1522 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for database management, the computer-implemented method comprising:
   receiving, by one or more computer processors, a transaction, wherein the transaction involves a data in a relational database management system;
   determining, by one or more computer processors, a page in the relational database management system with the data;
   determining, by one or more computer processors, whether the page has a hybrid lock enabled using a hybrid lock hash table;
   responsive to determining, by one or more computer processors, the page has the hybrid lock enabled, determining, by one or more computer processors, whether the page is above a hot page threshold.

2. The computer-implemented method of claim 1, further comprising:
   responsive to determining, by one or more computer processors, the page is above the hot page threshold in the hybrid lock hash table, locking, by one or more computer processors, a candidate row of the page, wherein the candidate row contains at least part of the data.

3. The computer-implemented method of claim 2, further comprising:
   providing, by one or more computer processors, access to the locked candidate row of the page;
   receiving, by one or more computer processors, an indication of completion of access to the locked candidate row; and
   responsive to receiving the indication, unlocking, by one or more computer processors, the locked candidate row of the page.

4. The computer-implemented method of claim 1, further comprising:
   responsive to determining, by one or more computer processors, the page is not above the hot page threshold in the hybrid lock hash table, locking, by one or more computer processors, a candidate page of the page, wherein the candidate page contains at least part of the data.

5. The computer-implemented method of claim 1, further comprising:
   receiving, by one or more computer processors, one or more factors; and
   updating, by one or more computer processors, the hybrid lock hash table using the one or more factors.

6. The computer-implemented method of claim 5, wherein the one or more factors is selected from the group consisting of a bufferpool residency time, a number of transaction waiting for one or more pages in the relational database management system, and an amount of wait time for one or more pages in the relational database management system.

7. The computer-implemented method of claim 6, wherein the bufferpool residency time is an amount of time a page of one or more pages in the relational database management system spends in a bufferpool, wherein the bufferpool is an area of memory that is allocated to relational database management system for caching data as it is read from a storage location.

8. A computer program product for database management, the computer program product comprising:
   one or more computer readable storage media; and
   program instructions stored on the one or more computer readable storage media, the program instructions comprising:
      program instructions to receive a transaction, wherein the transaction involves a data in a relational database management system;
      program instructions to determine a page in the relational database management system with the data;
      program instructions to determine whether the page has a hybrid lock enabled using a hybrid lock hash table;
      responsive to determining the page has the hybrid lock enabled, program instructions to determine whether the page is above a hot page threshold.

9. The computer program product of claim 8, further comprising one or more of the following program instructions, stored on the one or more computer readable storage media, to:
   responsive to determining the page is above the hot page threshold in the hybrid lock hash table, lock a candidate row of the page, wherein the candidate row contains at least part of the data.

10. The computer program product of claim 9, further comprising one or more of the following program instructions, stored on the one or more computer readable storage media, to:
    provide access to the locked candidate row of the page;
    receive an indication of completion of access to the locked candidate row; and
    responsive to receiving the indication, unlock the locked candidate row of the page.

11. The computer program product of claim 8, further comprising one or more of the following program instructions, stored on the one or more computer readable storage media, to:
    responsive to determining the page is not above the hot page threshold in the hybrid lock hash table, lock a candidate page of the page, wherein the candidate page contains at least part of the data.

12. The computer program product of claim 8, further comprising one or more of the following program instructions, stored on the one or more computer readable storage media, to:
    receive one or more factors; and
    update the hybrid lock hash table using the one or more factors.

13. The computer program product of claim 12, wherein the one or more factors is selected from the group consisting of a bufferpool residency time, a number of transaction waiting for one or more pages in the relational database management system, and an amount of wait time for one or more pages in the relational database management system.

14. The computer program product of claim 13, wherein the bufferpool residency time is an amount of time a page of one or more pages in the relational database management system spends in a bufferpool, wherein the bufferpool is an area of memory that is allocated to relational database management system for caching data as it is read from a storage location.

15. A computer system for database management, the computer system comprising:
one or more computer processors;
one or more computer readable storage media; and
program instructions, stored on the one or more computer readable storage media for execution by at least one of the one or more computer processors, the program instructions comprising:
program instructions to receive a transaction, wherein the transaction involves a data in a relational database management system;
program instructions to determine a page in the relational database management system with the data;
program instructions to determine whether the page has a hybrid lock enabled using a hybrid lock hash table;
responsive to determining the page has the hybrid lock enabled, program instructions to determine whether the page is above a hot page threshold.

16. The computer system of claim 15, further comprising one or more of the following program instructions, stored on the one or more computer readable storage media for execution by at least one of the one or more computer processors, to:
responsive to determining the page is above the hot page threshold in the hybrid lock hash table, lock a candidate row of the page, wherein the candidate row contains at least part of the data.

17. The computer system of claim 16, further comprising one or more of the following program instructions, stored on the one or more computer readable storage media for execution by at least one of the one or more computer processors, to:
provide access to the locked candidate row of the page;
receive an indication of completion of access to the locked candidate row; and
responsive to receiving the indication, unlock the locked candidate row of the page.

18. The computer system of claim 16, further comprising one or more of the following program instructions, stored on the one or more computer readable storage media for execution by at least one of the one or more computer processors, to:
receive one or more factors; and
update the hybrid lock hash table using the one or more factors.

19. The computer system of claim 18, wherein the one or more factors is selected from the group consisting of a bufferpool residency time, a number of transaction waiting for one or more pages in the relational database management system, and an amount of wait time for one or more pages in the relational database management system.

20. The computer system of claim 15, further comprising one or more of the following program instructions, stored on the one or more computer readable storage media for execution by at least one of the one or more computer processors, to:
responsive to determining the page is not above the hot page threshold in the hybrid lock hash table, lock a candidate page of the page, wherein the candidate page contains at least part of the data.

* * * * *